Dec. 31, 1935.  O. P. PIERSON  2,026,249
AIR SERVICING DEVICE
Filed April 8, 1932  2 Sheets-Sheet 1

Inventor
OLOF P. PIERSON
by Kenny & Witter
Attorneys

Dec. 31, 1935.   O. P. PIERSON   2,026,249
AIR SERVICING DEVICE
Filed April 8, 1932   2 Sheets-Sheet 2

Inventor
OLOF P. PIERSON
by Kenway & Witter
Attorneys

Patented Dec. 31, 1935

2,026,249

UNITED STATES PATENT OFFICE 2,026,249

AIR SERVICING DEVICE

Olof P. Pierson, Caribou, Maine

Application April 8, 1932, Serial No. 604,037

6 Claims. (Cl. 50—12)

This invention relates to air servicing devices especially adapted to provide a predetermined pressure of air in pneumatic tires. I am aware of devices of this general nature heretofore known but believe that all such devices have been limited to inflation purposes only. It quite frequently happens that automobile tires will be over inflated, thus causing the vehicle to ride hard and the tires to be taxed beyond their intended pressures. One object of my invention is to provide an improved air servicing device which will act automatically to inflate or deflate a tire to a predetermined pressure, thus supplying the deflating deficiency of such devices heretofore known and eliminating any over inflation of tires serviced thereby.

Tire inflating devices heretofore known have been exceedingly complex in both construction and operation, embodying a large number of valves, springs and other intricate parts and connections. In accordance with another aspect of my invention, I provide a new and improved air servicing device which may be constructed for either or both inflating and deflating purposes and which functions on the simple principle of a balanced air pressure relation, thus eliminating most of the intricacies heretofore required in these devices. The device may be set to a predetermined air pressure and provision is made for causing it thereafter to produce automatically a like pressure, by either inflation or deflation, in an automobile tire or other chamber to which it is connected, the device automatically closing the connection when the pressure in the tire reaches the predetermined pressure. Another object of my invention resides in the provision of such an improved device of this nature.

In servicing automobile tires with air, it is desirable that the inflating or deflating to the desired pressures shall be performed as quickly as possible. Should the communication to the tire be gradually closed as the tire pressure approaches the desired pressure, the last portion of the servicing operation would be performed at a relatively slow rate. Another aspect of my invention relates to the provision of quick-acting means whereby the communicating port or ports are allowed to remain wide open until the predetermined pressure has been substantially reached, the means then acting quickly to snap the valve or the like to the closed position. Another object of my invention resides in the provision of a mechanically operated connection for this purpose, which connection is of relatively simple and inexpensive construction and functions with great speed to bring the device quickly from the inflating or deflating position to the closed position.

These and other features of the invention will be best understood and appreciated from the following description of a preferred embodiment thereof, selected for purposes of illustration and shown in the accompanying drawings, in which Fig. 1 is an elevation, partially in section, of my improved air servicing device;

Figure 1:
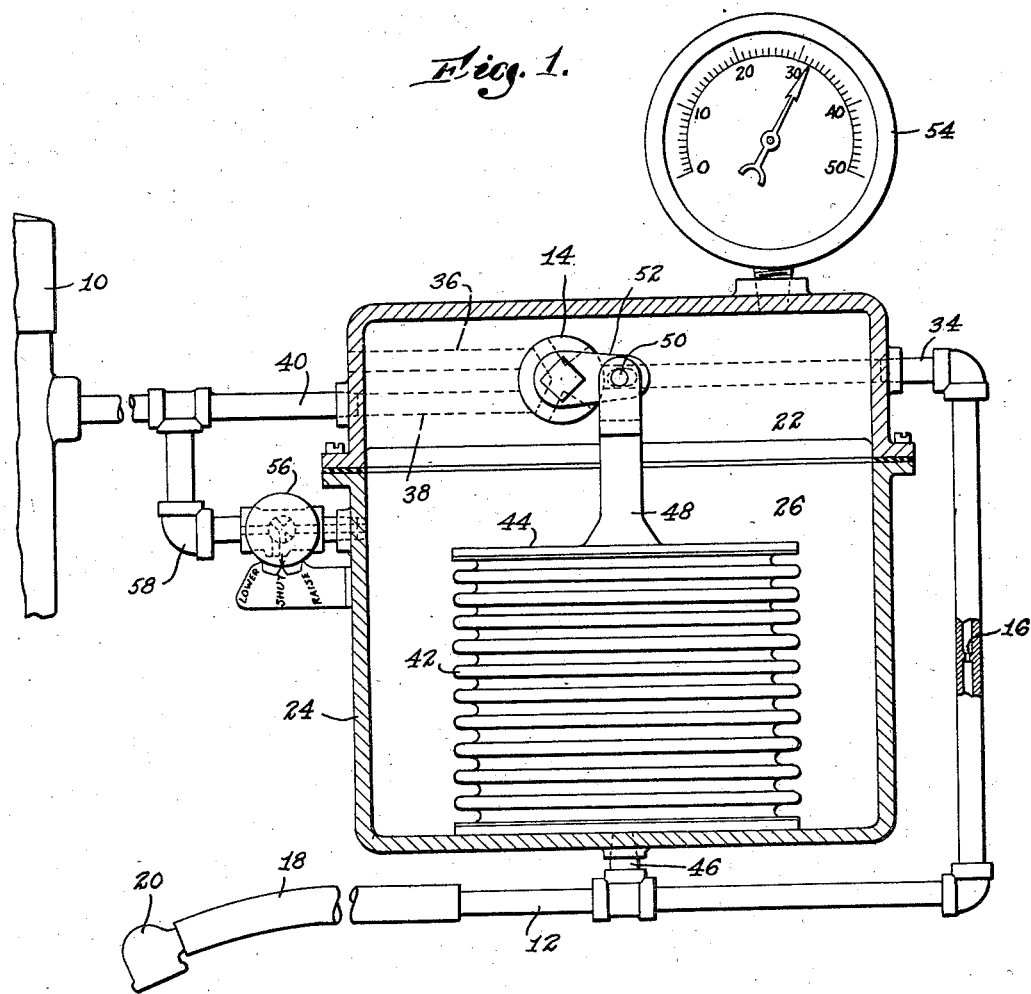
Figure 2:
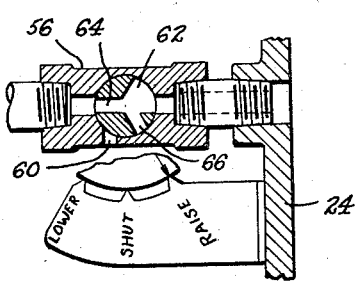
Fig. 2 is a fragmentary sectional view of the air pressure controlling valve shown in Fig. 1.
Figure 3:
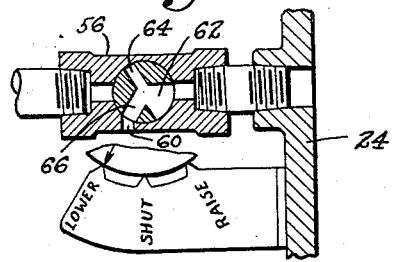
Fig. 3 is a like view showing the valve in another position.

I will now proceed to describe my improved air servicing device as illustrated in Figs. 1-5 of the drawings. A source of air under pressure at 10 may be placed in communication with an air delivery conduit 12 through a three-way rotary valve 14, the passage being somewhat restricted at 16 and a delivery hose 18 and check valve 20 being connected to the conduit. The valve 14 is mounted in a wall 22 of a housing 24, providing a closed air chamber 26. The valve has three ports 28, 30 and 32, the port 28 being in constant communication with the portion 34 of the conduit 12 and the ports 30 and 32 being adapted respectively to communicate with exit port 36 and port 38 and pipe 40 to the tank 10.

Figure 4:
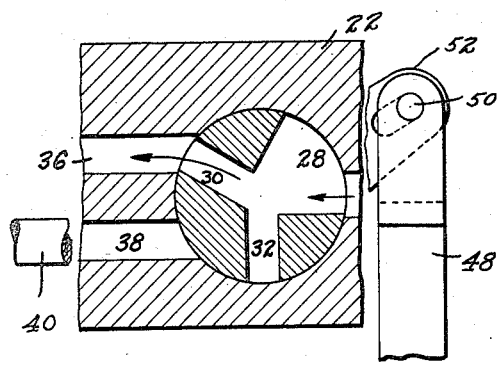
Fig. 4 is an enlarged sectional view of the main air controlling valve shown in Fig. 1.
Figure 5:
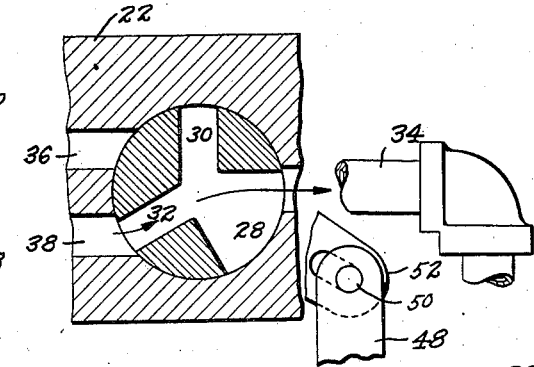
Fig. 5 is a like view showing the valve in another position.

Mounted within the chamber 26 on its bottom wall is a bellows 42 having a closed top wall 44 and providing therein a second chamber in communication with the conduit 12 at 46. A standard 48, carried by the top wall 44, has a pin and slot connection 50 with an arm 52 on the valve 14, whereby expansion and contraction of the bellows rotates the valve. It being understood that the check valve 20 is normally closed, the pressures in the bellows chamber and the chamber 26 automatically balance or equalize, and the device normally comes to rest in the position shown in Fig. 1. Should the pressure in chamber 26 be greater than in the bellows, the bellows will be contracted, thus rotating the valve 14 clockwise and admitting air to the bellows through the port 32 (Fig. 5). Should the pressure in the bellows chamber be greater than in the chamber 26, the bellows will be expanded, thus rotating the valve anti-clockwise and releasing air from the bellows through the port 30 (Fig. 4). When the pressure in the two chambers balance, the device will automatically return to the position of Fig. 1.

The pressure in the chamber 26 is indicated by an air gauge 54, and this pressure can be varied in either direction by a hand-controlled valve 56. This valve is inserted in a conduit 58, connecting the pipe 40 with the chamber 26, and is furthermore provided with an exhaust port 60. The valve has three ways or ports, the way 62 being in constant communication with the chamber 26 and the ways 64 and 66 being adapted to be placed in communication with the conduit 58 and exhaust port 60 respectively. The valve is shown in the closed position in Fig. 1. When it is desired to raise the pressure in the chamber 26, the valve is turned to the position of Fig. 2, and when it is desired to lower the pressure the valve is turned to the position of Fig. 3.

The operation of the device may be briefly described as follows. The valve 56 is first manipulated to place a pressure of air in the chamber 26 equal to the pressure which it is desired to produce in the tire to be inflated or deflated, the pressure of chamber 26 being observed from the gauge 54. As thus pressure is raised or lowered, the device operates automatically to equalize the pressures within the bellows chamber and the chamber 26, as has been heretofore described. The operator then places the check valve 20 in communication with the tire.

If the tire is under inflated, air flows thereinto, thus lowering the pressure in the bellows chamber and causing the bellows to contract and rotate the valve 14 clockwise, as shown in Fig. 5, whereby air flows to the tire from the tank 10. When the tire becomes inflated to the pressure of the chamber 26, the bellows will be raised and held to the position of Fig. 1, wherein the valve 14 is closed. The valve 14 may move in a somewhat fluctuating manner during the inflating operation, due to the restricted opening into the tire, but compensation for such operation will be cared for to a large extent by the restricted opening 16 to the conduit 12.

Should the tire be over inflated, air will flow therefrom into the conduit 12 and into the bellows, thus causing the bellows to expand and rotate the valve 14 anti-clockwise, as shown in Fig. 4. In this position of the valve, air flows from the tire through the exit ports 30 and 36. When the tire becomes deflated to the pressure of the chamber 26, the bellows will contract and be held in the position of Fig. 1, wherein the valve 14 is closed.

Figure 7:
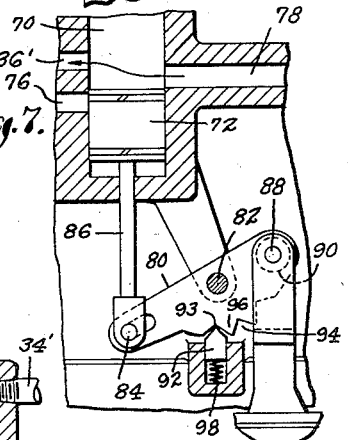
Figs. 7 and 8 are fragmentary views of Fig. 6 showing the parts in other positions.
Figure 6:
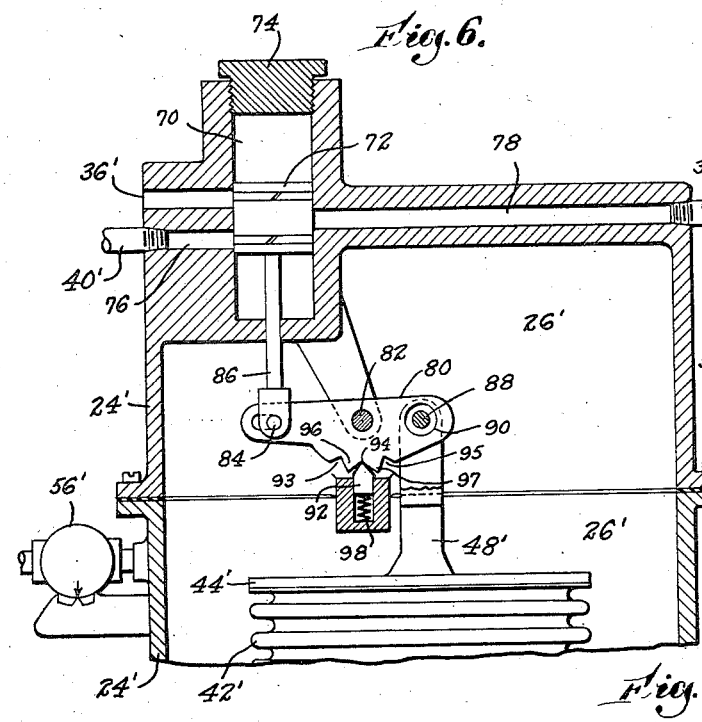
Fig. 6 is a fragmentary view similar to Fig 1 but showing a modified construction.
Figure 8:
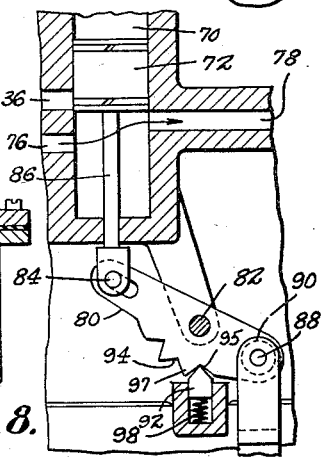

In Figs. 6–8 of the drawings I have shown the device somewhat modified from the construction of Figs. 1–5 and have embodied therewith a quick-acting connection for causing the main air controlling valve to close quickly when the predetermined pressure has been reached in the tire, thus permitting a free flow of air to or from the tire substantially until the desired pressure is reached. This modified construction embodies a housing 24' providing an air chamber 26', within which is mounted a bellows 42' and in which the air pressure can be varied by a valve at 56', the parts not illustrated as different in Figs. 6–8 being the same as in Figs. 1–5 and indicated by the same reference characters primed. The source of air 40' and exit port 36' may be placed in communication with the conduit 34' through a chamber 70, within which is slidably mounted a valve member 72, the chamber being formed in one wall of the housing 24' and being closed by a plug 74, and ports 76 and 78 being formed in the housing from the conduits 40' and 34'. In its intermediate position (Fig. 6), the valve closes communication between the port 78 and ports 36' and 76; in its lowermost position (Fig. 7), communication is established between port 78 and the exit port 36'; and in its uppermost position (Fig. 8), communication is established between port 78 and the source of air port 76. The connection now to be described causes the valve to be shifted automatically to these positions in accordance with the air pressures within the bellows chamber and the chamber 26'.

A lever 80, pivoted at 82, has a pin and slot connection 84 to the valve stem 86. The other end of the lever has a lost motion connection to the bellows standard 48', this connection comprising a pin 88 carried by the standard 48' and engaging within a relatively large hole 90 in the lever. The valve is normally brought to one of the three positions illustrated by a spring-pressed plunger 92 engaging within one of three V-shaped notches 93, 94 and 95 in the lever, two V-shaped teeth 96 and 97 being located between the notches. The pressures in the bellows chamber and chamber 26 are normally balanced in the manner heretofore described in connection with Figs. 1–5, and the device is, therefore, normally in the intermediate position shown in Fig. 6.

The operation of this form of the device is substantially as follows. The valve 56' is manipulated to place in the chamber 26' the air pressure which it is desired to produce in the tire and the check valve is then placed in communication with the tire. If the tire is under inflated, air flows thereinto, thus lowering the pressure in the bellows chamber and causing the bellows to contract. When the bellows has contracted sufficiently to cause the apex of the tooth 97 to pass the plunger 92, the plunger acts quickly to throw the lever and valve to the position of Fig. 8, wherein communication is established between the source of air 40' and the conduit 34'. Air now flows freely to the tire from the source of pressure, and when the pressure in the tire and conduit 12' substantially reaches the predetermined pressure in the chamber 26', the pressure in the bellows will sufficiently balance the pressure in the chamber 26' to cause rotation of the lever anti-clockwise and pass its tooth 97 beyond the plunger, which plunger thereupon operates quickly to throw the lever and valve to the closed position of Fig. 6. It will be understood that the spring 96 and tooth 97 are so constructed as to permit the apex of the tooth to pass the apex of the plunger when the predetermined pressure is substantially reached. It will furthermore be understood that the device may operate in a somewhat fluctuating manner. These operations will, however, be performed quickly whereby to permit free flow of air while the valve is open, and thus hasten the servicing efficiency of the device. Should the tire be over inflated, the operation above described is simply reversed, air from the tire entering the bellows, causing the device to move to the position of Fig. 7, and thereafter to return quickly to the position of Fig. 6 when the tire has been deflated to the predetermined pressure within the chamber 26.

Having thus described my invention, what I claim as new and desire to secure by Letters Patent is:

1. In a pressure regulator, means providing a main chamber, a collapsible bellows within the chamber and providing a secondary chamber within the bellows, means for varying the pressure within the main chamber, a gage for indicating such pressure, means providing a pressure port and an exhaust port, means providing a delivery port having a branch in communication with the secondary chamber, a valve member between and directly cooperating with the pressure and exhaust ports and the delivery port for controlling communication therebetween, and connections between the bellows and valve member whereby contraction of the bellows moves the member to bring the pressure and delivery ports into communication and expansion of the bellows moves the member to bring the exhaust and delivery ports into communication.

2. In a pressure regulator, means providing a main chamber, means for varying the pressure within the chamber, a gage for indicating such pressure, a bellows having collapsible side walls and having an end wall located to receive the air pressure of said chamber thereagainst, means providing a pressure port and an exhaust port, means providing a delivery port in communication with the interior of the bellows, a valve member between and directly cooperating with the pressure and exhaust ports and the delivery port for controlling communication therebetween, and connections between the bellows and valve member whereby contraction of the bellows moves the member in one direction to bring the pressure and delivery ports into communication and expansion of the bellows moves the member in opposite direction to bring the exhaust and delivery ports into communication.

3. In a pressure regulator, means providing main and secondary chambers including a movable wall therebetween, means for varying the pressure within the main chamber, a gage for indicating such pressure, means providing a pressure port and an exhaust port, means providing a delivery port in communication with the secondary chamber, a valve member between and directly cooperating with the pressure and exhaust ports and the delivery port for controlling communication therebetween, and connections between the wall and valve member whereby movement of the wall in one direction moves the member to bring the pressure and delivery ports into communication and movement thereof in the opposite direction moves the member to bring the exhaust and delivery ports into communication.

4. The combination set forth in claim 3, plus means automatically delaying movement of the valve member to bring the pressure and delivery ports into communication or the exhaust and delivery ports into communication until the pressures in the two chambers are substantially equal.

5. The combination set forth in claim 3, wherein the valve member occupies an intermediate position closing communication between all of said ports when the pressures in the two chambers are equal.

6. In a pressure regulator, means providing main and secondary air chambers, means for varying the pressure within the main chamber, a gage for indicating such pressure, means providing a delivery port in communication with the secondary chamber, means providing a pressure port and an exhaust port, valve means between and directly cooperating with the pressure and exhaust ports and the delivery port for controlling communication therebetween, and means including an element operative on the valve means for opening communication between the pressure and delivery ports when the pressure in the secondary chamber is less than the pressure in the main chamber and for establishing communication between the exhaust and delivery ports when the pressure in the secondary chamber is greater than the pressure in the main chamber, and means operating mechanically on the last-named means for delaying the closing of either of said communications until the pressures in the two chambers are substantially equal and then acting quickly to close the same.

OLOF P. PIERSON.